United States Patent
Toma et al.

(10) Patent No.: US 11,150,886 B2
(45) Date of Patent: Oct. 19, 2021

(54) AUTOMATIC PROBABILISTIC UPGRADE OF TENANT DEVICES

(71) Applicant: Microsoft Technology Licensing, LLC, Redmond, WA (US)

(72) Inventors: Kay Megumi Toma, Redmond, WA (US); Carlos Alberto Zamora Cura, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/558,577

(22) Filed: Sep. 3, 2019

(65) Prior Publication Data

US 2021/0064356 A1    Mar. 4, 2021

(51) Int. Cl.
*G06F 8/65* (2018.01)
*G06F 17/18* (2006.01)

(52) U.S. Cl.
CPC .............. *G06F 8/65* (2013.01); *G06F 17/18* (2013.01)

(58) Field of Classification Search
CPC ............................. G06F 8/65; G06F 17/18
See application file for complete search history.

(56) References Cited

U.S. PATENT DOCUMENTS

| | | | |
|---|---|---|---|
| 7,555,551 B1 | 6/2009 | McCorkendale et al. | |
| 8,365,009 B2 | 1/2013 | Dournov et al. | |
| 8,438,253 B2 | 5/2013 | Szabo et al. | |
| 8,713,137 B2 | 4/2014 | Ji et al. | |
| 8,756,094 B2 | 6/2014 | Keinan | |
| 9,229,902 B1* | 1/2016 | Leis | H04L 41/0866 |
| 9,558,464 B2 | 1/2017 | Bassin et al. | |
| 9,747,440 B2* | 8/2017 | Gupta | H04L 63/1425 |
| 10,025,583 B2 | 7/2018 | Butler et al. | |
| 2006/0248116 A1 | 11/2006 | Sobel | |
| 2010/0153328 A1* | 6/2010 | Cormode | G06N 5/04 706/52 |
| 2011/0022430 A1* | 1/2011 | Held | G06Q 10/06 705/7.28 |

(Continued)

OTHER PUBLICATIONS

Christensen et al., "Confidence sets for continuous-time rating transition probabilities", Aug. 2004, Elsevier B.V. (Year: 2004).*

(Continued)

*Primary Examiner* — Anna C Deng
*Assistant Examiner* — Junchun Wu

(57) ABSTRACT

In one example of the technology, device information associated with a device upgrade and a plurality of devices includes risk parameters including values associated with a minimum health value that is associated with a minimum acceptable number of healthy devices among the plurality of devices and a confidence value associated with a minimum acceptable probability that the number of healthy devices among the plurality of devices is at least as great as the minimum health value; and, for each device a success probability value that is associated with a probability that the device will be healthy after the device upgrade is performed on the device. A Poisson binomial distribution is iteratively used to determine a set of devices among the plurality of device for which the largest possible number of devices are included in the set of devices while meeting the risk parameters. The set of devices is then upgraded.

20 Claims, 4 Drawing Sheets

(56) References Cited

U.S. PATENT DOCUMENTS

| | | | | |
|---|---|---|---|---|
| 2012/0044877 | A1* | 2/2012 | Ratasuk | H04W 52/146 |
| | | | | 370/329 |
| 2012/0095803 | A1* | 4/2012 | Tsuru | G01M 99/00 |
| | | | | 705/7.28 |
| 2012/0323827 | A1* | 12/2012 | Lakshmanan | G06N 5/003 |
| | | | | 706/12 |
| 2015/0019639 | A1* | 1/2015 | Marlow | H04L 67/22 |
| | | | | 709/204 |
| 2015/0195721 | A1 | 7/2015 | Costelloe | |
| 2016/0085889 | A1* | 3/2016 | Sewak | G06F 30/20 |
| | | | | 703/2 |
| 2016/0253102 | A1 | 9/2016 | Andrews et al. | |
| 2020/0019393 | A1* | 1/2020 | Vichare | G06F 8/60 |
| 2020/0204468 | A1* | 6/2020 | Nickolov | H04L 63/1433 |
| 2020/0258503 | A1* | 8/2020 | Maeda | G10L 15/10 |
| 2020/0310394 | A1* | 10/2020 | Wouhaybi | H04L 41/0846 |

OTHER PUBLICATIONS

Bernecker et al., "Scalable Probabilistic Similarity Ranking in Uncertain Databases", Sep. 2010, IEEE, vol. 22, No. 9 (Year: 2010).*

Butler et al., "The Distribution of a Sum of Independent Binomial Random Variables", 2016, Springer Science (Year: 2016).*

Choudhary et al., "Visibility Probability Structure from SfM Datasets and App", 2012, Springer-Verlag, pp. 130-143 (Year: 2012).*

"Using a Risk Based Assessment for Establishing a Medical Equipment Maintenance Program", Retrieved from https://cursos.campusvirtualsp.org/repository/coursefilearea/file.php/209/Content2017/13_Life_cycle_maint/Chapter%203_4.pdf, Jul. 2, 2019, 16 Pages.

Dumitras, et al., "Why Do Upgrades Fail and What Can We Do about It? Toward Dependable, Online Upgrades in Enterprise System", In Proceedings of 10th ACM/IFIP/USENIX International Conference on Middleware, Nov. 30, 2009, pp. 349-372.

Hayden, et al., "Evaluating Dynamic Software Update Safety Using Systematic Testing", In Journal of IEEE Transactions on Software Engineering, vol. 38, Issue 6, Nov. 1, 2012, pp. 1-20.

Hong, Yili, "On computing the distribution function for the Poisson binomial distribution", In Journal of Computational Statistics and Data Analysis, vol. 59, Mar. 2013, pp. 41-51.

"Poisson Binomial Distribution", Retrieved from: https://en.wikipedia.org/w/index.php?title=Poisson_binomial_distribution&oldid=911717970, Retrieved Date: Oct. 28, 2020, 4 Pages.

"International Search Report and Written Opinion Issued in PCT Application No. PCT/US2020/037993", dated Sep. 23, 2020, 13 Pages.

* cited by examiner

AUTOMATIC PROBABILISTIC UPGRADE OF TENANT DEVICES

BACKGROUND

Deployment of a software update to a tenant with a large number of devices is typically handled in a manual fashion by an IT administrator. Rather than upgrading all of the devices at once, which may be risky if a failure occurs in a larger number of devices, the IT administrator will typically select ever-enlarging "rings" of devices for upgrade in a somewhat arbitrary fashion, or based on whatever the IT administrator may happen to know about the devices. For example, 10 devices might be upgraded in the first ring, 100 devices upgraded in the second ring, and 500 devices upgraded in the third ring.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to the administration of software updates to a group of devices. In one example of the technology, device information associated with a device upgrade and a plurality of devices is received. In some examples, the device information includes risk parameters including values associated with a minimum health value that is associated with a minimum acceptable number of healthy devices among the plurality of devices and a confidence value that is associated with a minimum acceptable probability that the number of healthy devices among the plurality of devices is at least as great as the minimum health value. In some examples, the device information further includes, for each device of the plurality of devices, a success probability value that is associated with a probability that the device will be healthy after the device upgrade is performed on the device. In some examples, a Poisson binomial distribution is iteratively used to determine, based in part on the success probability values of the plurality of devices, a set of devices among the plurality of device for which the largest possible number of devices are included in the set of devices while meeting the risk parameters, according to the Poisson binomial distribution. In some examples, after determining the set of devices, the device upgrade is automatically performed on each device of the set of devices.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
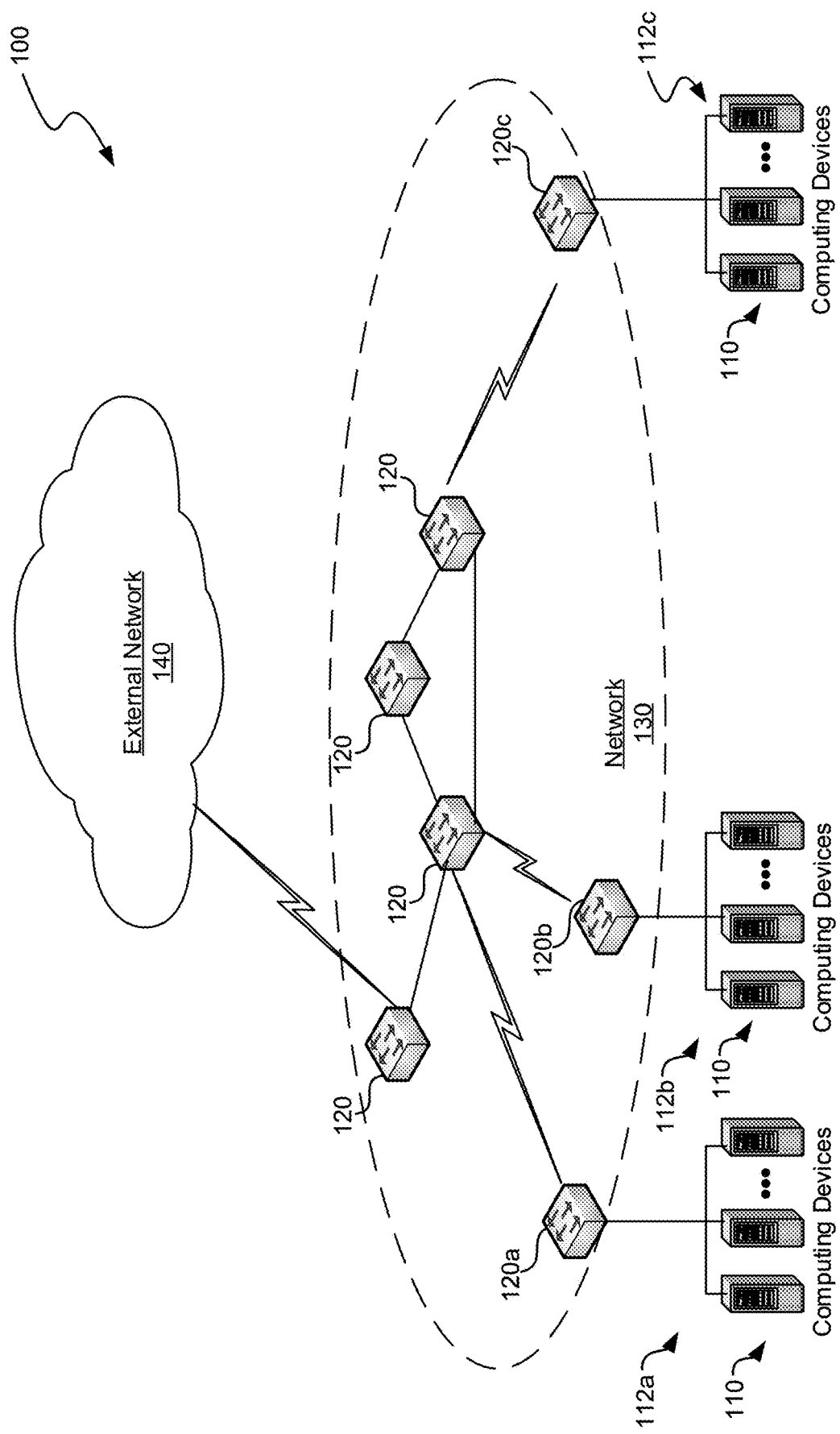
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to the administration of software updates to a group of devices. In one example of the technology, device information associated with a device upgrade and a plurality of devices is received. In some examples, the device information includes risk parameters including values associated with a minimum health value that is associated with a minimum acceptable number of healthy devices among the plurality of devices and a confidence value that is associated with a minimum acceptable probability that the number of healthy devices among the plurality of devices is at least as great as the minimum health value. In some examples, the device information further includes, for each device of the plurality of devices, a success probability value that is associated with a probability that the device will be healthy after the device upgrade is performed on the device. In some examples, a Poisson binomial distribution is iteratively used to determine, based in part on the success probability values of the plurality of devices, a set of devices among the plurality of device for which the largest possible number of devices are included in the set of devices while meeting the risk parameters, according to the Poisson binomial distribution. In some examples, after determining the set of devices, the device upgrade is automatically performed on each device of the set of devices.

In some examples, an upgrade service automatically performs a device upgrade for devices in a tenant in a probabilistic manner. In some examples, the device upgrade process takes as inputs each of the devices in a tenant that are to be upgraded; success probabilities, which are the expected probability for each device in the tenant that the device will be healthy after the upgrade is complete; and risk parameters that are associated with: a healthy device minimum, which is the minimum acceptable number of healthy devices in the tenant, and a confidence value that is associated with a minimum acceptable probability that the number of healthy devices among the devices in the tenant is at least as great as the healthy device minimum. The probability that the device will be healthy after the upgrade is complete may be determined in various ways, as discussed in greater detail below.

Based on these inputs, in some examples, a Poisson binomial distribution is used to determine, for a minimal subset of the devices in the tenant, the probability that the number healthy devices in the tenant that would remain if the minimal subset of devices were upgraded would be at least as great as the healthy device minimum. In some examples, if, based on the Poisson binomial distribution, the probability is at least as great as the confidence value, then another device is added to the subset, with the same determination made again, repeating the process iteratively and adding devices until the probability that the number of healthy devices remaining after the upgrade is installed for those devices is at least the healthy device minimum is less than the confidence value. In some examples, the set of devices in the iteration immediately before the probability is less than the confidence value is determined as the set of devices to upgrade.

In these examples, the set of devices to upgrade are the devices selected for the next round of upgrades. In some examples, once the set of devices to upgrade is determined, the upgrade service automatically causes the set of devices to be upgraded.

In some examples, the selection of devices for each iteration of the selection of devices uses a greedy process, with the devices being selected in the order of highest probability of upgrade success to the lowest probability of upgrade success. In some examples, the selection is mostly greedy, but a small number of low-probability (i.e., high-risk) devices are included in a small number of the distribution iterations.

After the set of devices is upgraded, in some examples, the current number of healthy devices is upgraded, and the process is repeated. In some examples, because the process is relatively pessimistic, there are generally significantly more healthy devices remaining than the device minimum after the first round of upgrades, so that the process may be repeated for several rounds of upgrades. In some examples, the process continues until either all of the devices are upgraded, or until at some point the process determines that no further devices can be upgraded while expecting to maintain the device minimum according to the confidence value.

The disclosure is not limited to the example of device upgrades. It may also be used for any suitable scenario in which elements in a group are to be changed, for which it is possible to providing a probability of success of the change for each element in the group.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120C can then be operatively coupled to additional network nodes 120 to form a computer network in a hierarchical, flat, mesh, or other suitable types of topology that allows communications between computing devices no and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is a device that is part of a tenant, a device that is part of a service that manages one or more tenants, and/or the like, as discussed in greater detail below.

Illustrative Computing Device

Figure 2:
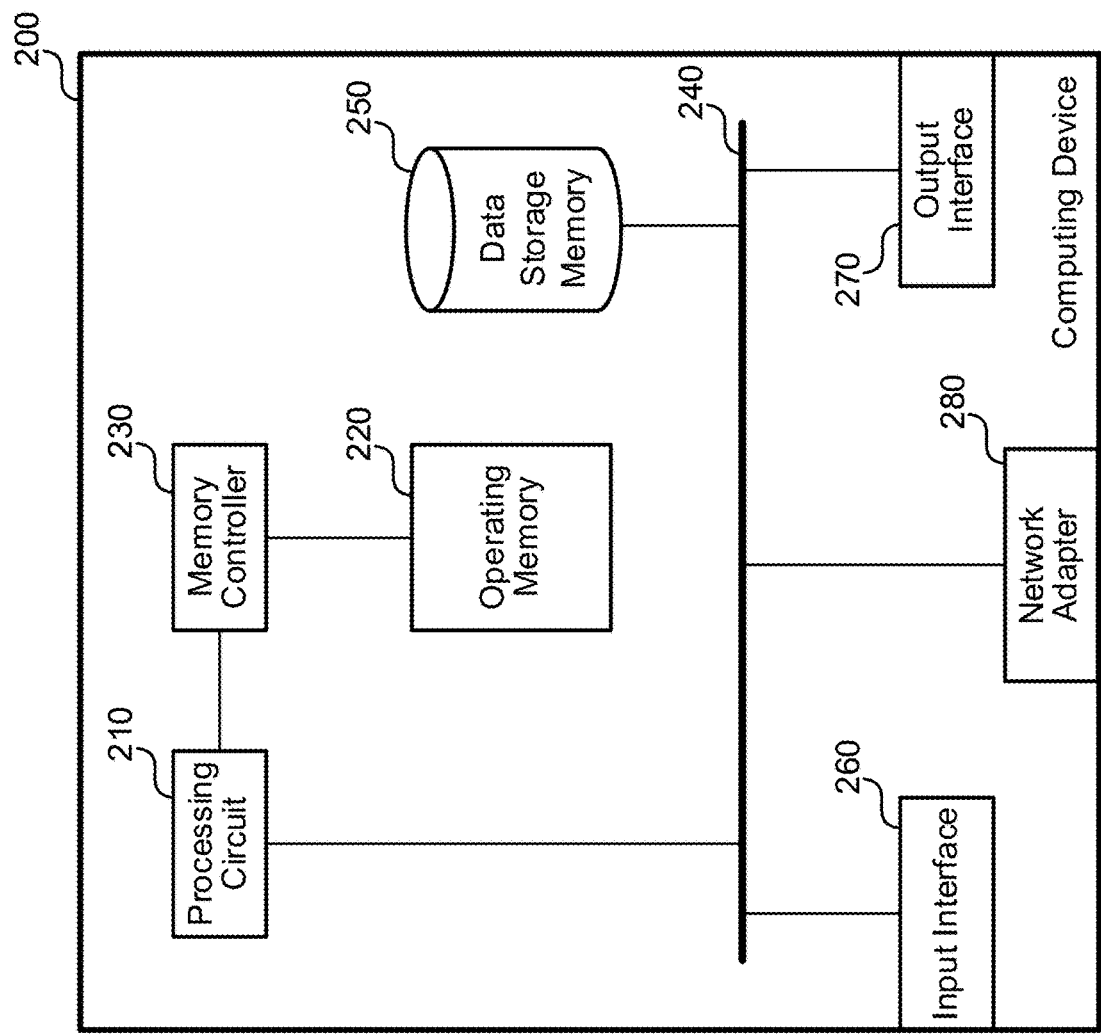
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices illustrated in or referred to in FIG. 3, as discussed in greater detail below. As illustrated in FIG. 2, computing device 200 includes processing circuit 210, operating memory 220, memory controller 230, data storage memory 250, input interface 26o, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include 4th generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 28o are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 26o, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 26o, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 26o and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 26o and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 28o may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 26o, output interface 270, or network adapter 28o may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, such as various actions disclosed herein with regard to FIG. 3 and/or FIG. 4 below.

Illustrative Systems

Figure 3:
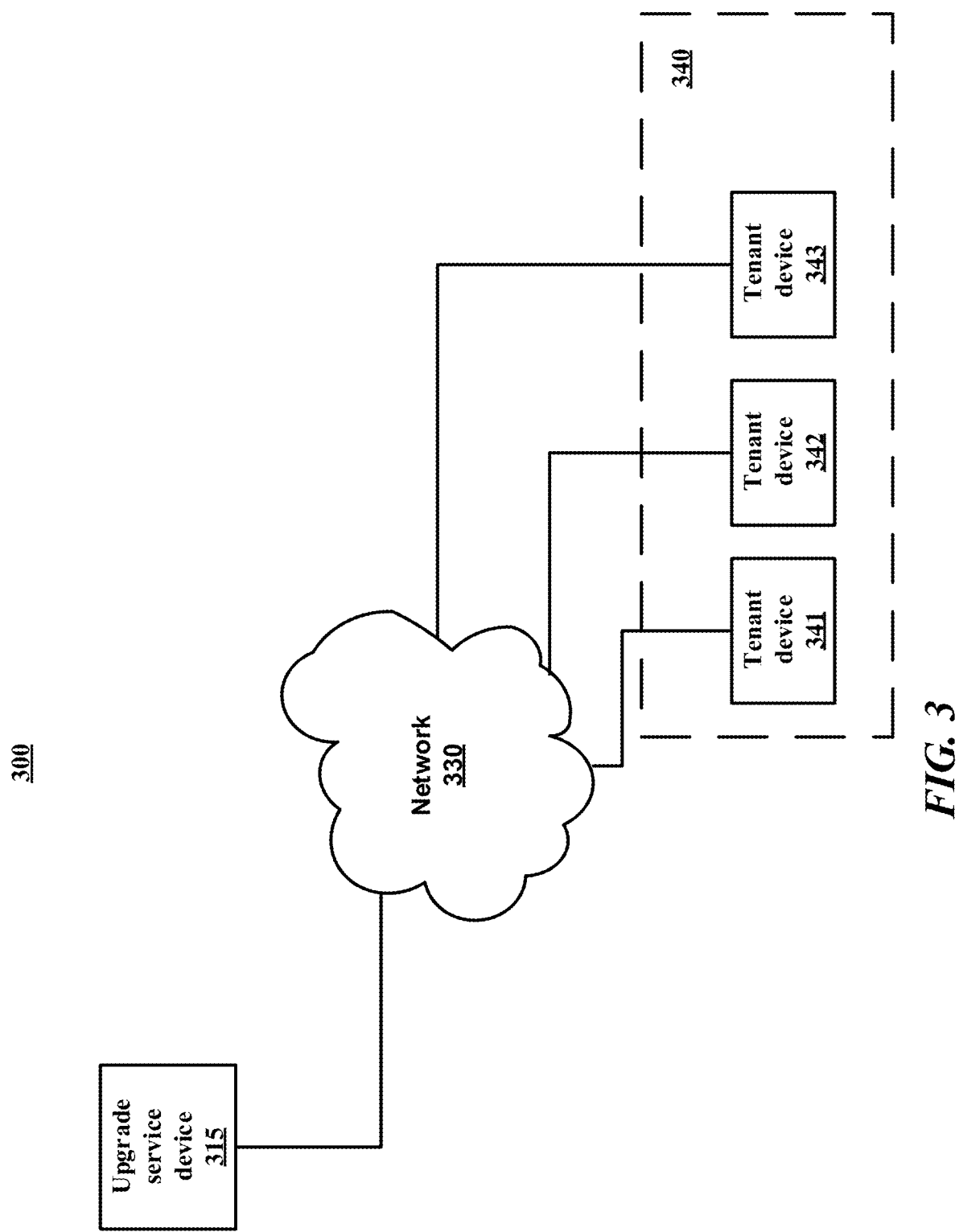
FIG. 3 is a block diagram illustrating an example of a system.

FIG. 3 is a block diagram illustrating an example of a system (300). System 300 may include network 330, as well as tenant 340 including tenant devices 341, 342, 343, and upgrade service device 315, which all connect to network 330.

Each of the tenant devices 341, 342, and 343 and/or upgrade service device 315 may include examples of computing device 200 of FIG. 2.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 includes any communication method by which information may travel between tenant devices 341, 342, and 343 and upgrade service device 315. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

Although some examples of system 300 utilize a network convention, in some examples, a network connection is not used, and upgrade service device 315 communicates with the tenant devices (e.g., devices 341-343) in some manner other than a network connection.

System 300 may include more or less devices than illustrated in FIG. 3, which is shown by way of example only. For instance, in various examples, there may be many more tenant devices than three tenant devices, as illustrated in FIG. 3, which are shown by way of example only. In general, a tenant may include any group of devices capable of upgrade that share a common connection. Upgrade service device 315 may be configured to manage the upgrade process for the devices in tenant 340.

In some examples, upgrade service device 315 automatically performs a device upgrade, such as a software upgrade, for devices (e.g., 341-343) in tenant 340 in a probabilistic manner. For instance, in some examples, the upgrade may be an operating system upgrade for the devices in tenant 340. In some examples, the device upgrade process takes as inputs each of the devices in tenant 340 that are to be upgraded; success probabilities, which are the expected probability for each device in the tenant 340 that the device will be healthy after the upgrade is complete; and risk parameters that are associated with: a healthy device minimum, which is the minimum acceptable number of healthy devices in tenant 340, and a confidence value that is associated with a minimum acceptable probability that the number of healthy devices among the devices in tenant 340 is at least as great as the healthy device minimum. The probability that the device will be healthy after the upgrade is complete may be determined in various ways, as discussed in greater detail below.

Based on these inputs, in some examples, a Poisson binomial distribution is used to determine, for a minimal subset of the devices in tenant 340, the probability that the number healthy devices in tenant 340 that would remain if the minimal subset of devices were upgraded would be at least as great as the healthy device minimum. In some examples, if, based on the Poisson binomial distribution, the probability is at least as great as the confidence value, then another device from tenant 340 is added to the subset, with the same determination made again, repeating the process iteratively and adding devices from tenant 340 until the probability that the number of healthy devices remaining in tenant 340 after the upgrade is installed for those devices is at least the healthy device minimum is less than the confidence value. In some examples, the set of devices in the iteration immediately before the probability is less than the confidence value is determined as the set of devices in tenant 340 to upgrade.

In some examples, once the set of devices in tenant 340 to upgrade is determined, upgrade service device 315 automatically causes the set of devices to be upgraded.

In some examples, the selection of devices for each iteration of the selection of devices uses a greedy process, with the devices being selected in the order of highest probability of upgrade success to lowest probability of upgrade success. In some examples, the selection is mostly greedy, but a small number of low-probability (i.e., high-risk) devices are be included in a small number of the distribution iterations.

After the set of devices is upgraded, in some examples, the current number of healthy devices is upgraded, and the process is repeated. In some examples, because the process is relatively pessimistic, there are generally significantly more healthy devices remaining than the device minimum after the first round of upgrades, so that the process may be repeated for several rounds of upgrades. In some examples, the process continues until either all of the devices are upgraded, or until at some point the process determines that no further devices can be upgraded while expecting to maintain the device minimum according to the confidence value.

Normally the input of the healthy device minimum, the confidence value, and the success probabilities of the devices stay the same, but in some examples, some of these values can be changed over time. For instance, in some examples, the success probability and/or the number of healthy devices may change over time for various reasons. For example, a patch or fix may be released, which can increase the success probability of tenant devices, and/or which can be used to cause some of the unhealthy devices to become healthy devices, so that the inputs to the process can be upgraded accordingly. In some examples, the success probabilities for the tenant devices may be changed dynamically over time. For example, the success probabilities may be changed based on feedback from actual upgrade results, based on a bug that was known to affect a group of devices that is now believed to be fixed after a patch or a fix, or for other suitable reasons. In some examples, while the success probabilities and/or the number of devices that have been upgraded that are healthy can change based on external factors, the healthy device minimum and the confidence level can only be changed manually by the IT administrator, for example to manually control the speed of the selection process, or to continue the selection progress if no more devices can be upgraded under the current values for the healthy device minimum and the confidence value.

As discussed above, in some examples, the device upgrade process takes as inputs each of the devices in tenant 340 that are to be upgraded; success probabilities, which are the expected probability for each device in the tenant 340 that the device will be healthy after the upgrade is complete; and risk parameters that are associated with: a healthy device minimum, which is the minimum acceptable number of healthy devices in tenant 340, and a confidence value that is associated with a minimum acceptable probability that the number of healthy devices among the devices in tenant 340 is at least as great as the healthy device minimum. In some examples, the confidence value is defined a confidence value, a. As defined in some examples, there are three possible states of each device: healthy, unhealthy, and unknown. In these examples, unknown is the state used for an upgrade in progress.

A device may be defined as "healthy" if the device is operating normally, and unhealthy if the device does not operate normally. The definition of "healthy" or operating "normally" is something that can be technically defined per organization or per IT administrator based on their own needs and requirements. IT administrators can define "healthy" on the basis of their own assessment of what constitutes a "successful" upgrade.

In some examples, n is the total number of devices in tenant 340, and the risk parameter associated with the healthy device minimum is expressed as β, which represents the minimum acceptable proportion of healthy devices to the total number of devices, so that the minimum acceptable number of healthy devices in tenant 340 is βn. In some examples, the risk parameters a and 13 are determined by business needs and are defined inputs to upgrade service device 315.

For instance, if an example of tenant 340 had 100 devices, and it was determined that at least 0.85 of the devices in tenant 340 must be healthy, then, in this example, n=100, β=0.85, and βn=85.

In some examples, the confidence value a, which is an input to the device upgrade process, is the confidence probability that βn devices from among the n device in tenant 340 will remain healthy.

The devices in tenant 340 may be ordered according to the order in which they will be upgraded, with device 1 being the first device to be upgraded, device 2 being the second device to be upgraded, and so on. As discussed above, in some examples, the order is determined in a greedy order, with the device having the greatest probability of a successful upgrade being ordered first, with the devices being ordered from greatest probability of a successful upgrade to the lowest probability of a successful upgrade.

The probability for a particular device that the device will have a successful upgrade may be defined as p, with a subscript for the device number, with $p_1$ being the probability of a successful upgrade for device 1, $p_2$ being the probability of a successful upgrade for device 2, and so on, so that the probabilities are $p_1, \ldots, p_n$ respectively for the n devices in tenant 340. The probabilities can be determined in various ways in various examples. In some examples, a machine learning algorithm may be used working on the devices in tenant 340 to estimate the probabilities. In some examples, the probabilities are computed using a binary classification model using as features the devices specifications, apps, and drivers, and/or the like, with the scores then calibrated as probabilities using standard techniques such as Platt's sigmoid, Isotonic Regression, and/or the like.

Also, for the following, k may be defined is the number of devices in tenant 340 having the unknown state (i.e., the number of devices for which there is an upgrade in progress), t may be defined as the number of devices to be selected in the next iteration, and H may be defined as the number of predicted healthy devices after t devices have been selected for upgrade as predicted based on a Poisson distribution.

Accordingly, in some examples, the number of devices available for selection is equal to n−h−k, and H is given by:

$$H = h + \sum_{i=h-k+1}^{t} X_i + (n - h - k - t)$$

Where, in this example, $X_i$ is distributed as a Bernoulli ($p_i$) random variable. In this example, the join distribution of $(X_1, \ldots, X_t)$ is distributed as a Poisson-Bernoulli ($p_1, \ldots, p_t$) random vector.

In some examples, upgrade service device 315 manages the upgrade process to upgrade devices in tenant 340 while ensuring with a probability of a that at least βn devices will remain healthy at any time. In mathematical terms, ensuring the confidence in this way may be expressed that the probability that n is greater than the minimum health threshold proportion of the entire device population of tenant 340 is always greater than or equal to a, that is:

$$P(H \geq \beta n) \geq \alpha$$

This inequality may be rewritten as a cumulative distribution function (CDF)—the probability α that N is less than the minimum health threshold proportion of the entire device population of tenant 340 is always less than 1−the confidence.

$$P(H \leq \beta n) \leq 1-\alpha$$

This inequality may be rewritten as:

$$P\left(h + \sum_{i=h-k+1}^{t} X_i + (n-h-k-t) \leq \beta n\right) \leq 1-\alpha$$

$$P\left(\sum_{i=h-k+1}^{t} X_i \leq (\beta-1)n + k + t\right) \leq 1-\alpha$$

In some examples, as discussed above, a greedy algorithm approach may be used where devices are selected decreasing order of probability. In these examples, upgrade service device 315 loops through all devices in tenant 340 that have not yet been upgraded from the highest scored device to the lowest scored device, with upgraded and healthy devices and unknown devices having already been removed from this list.

The tenant slack may be defined as (β−1)n+k. In some examples, if slack is positive, no devices are selected. That is, in these examples, if slack is already positive, it means the optimal number of devices to select is zero. If slack is not positive, the slack may be used to start adding devices.

In some examples, looping through the rest of the devices in an iterative manner, upgrade service device 315 calculates the probability mass function (PMF) of all the devices up to the index using the Poisson-binomial distribution to approximate the distribution of the random variable (i.e., the left-hand side of the inequality above). In some examples, upgrade service device 315 uses the PMF to calculate the cumulative distribution function (CDF).

In some examples, upgrade service device 315 then determines the specific value at the index of slack+the index of devices of the current iteration. At the specific value, in some examples, if the specific value is less than 1-α, then upgrade service 315 will continue choosing devices and upgrade the optimal number of devices to select to this value because at least this number of devices are eligible for selection. Alternatively, in some examples, if this value is greater, this means that the number of devices has maxed out, and, accordingly, upgrade service 315 returns the optimal number of devices to select. By default in the beginning, the optimal number of devices to select is zero. Based on the optimal number of devices to select, in some examples, upgrade service 315 selects that number of devices from the highest to lowest scored devices, and then automatically causes those devices to be upgraded.

Even when the overall organizational health does fall below the minimum health, in some examples, the process is still able to continually choose devices in subsequent rounds/stages, after the current round/stage of upgrades is completed. In some examples, after a round of upgrades is complete, upgrade service 315 repeats this process for another round of upgrades, continuing to choose devices even when below minimum health in order to bring the overall organizational health of tenant 340 back up above the minimum health. Because of this recovery factor, in some examples, upgrade service 315 can continue to safely select devices based on the predictive powers of the calibrated probabilities of the devices in tenant 340.

As discussed above, in some examples, the process continues until either all of the devices are upgraded, or until at some point the process determines that no further devices can be upgraded while expecting to maintain the device minimum according to the confidence value. Also, as discussed above, parameters may be changed, and/or a patch or fix may be released, which may increase the success probability of tenant devices, and/or which can be used to cause some of the unhealthy devices to become healthy devices, so that the inputs to the process can be upgraded accordingly.

Although a greedy approach in which the devices are selected in the order of highest probability of upgrade success to lowest probability of upgrade success is discussed above with regard to one example, other suitable orders may be used in other examples. In some examples, the selection is mostly greedy, but a small number of low-probability (i.e., high-risk) devices are be included in a small number of the distribution iterations.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 4:
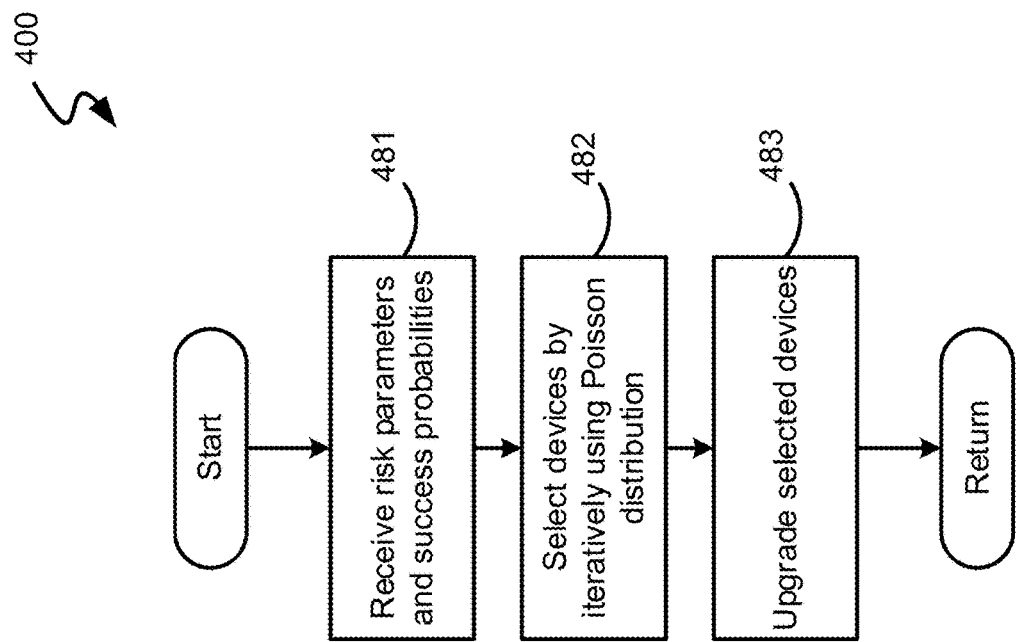
FIG. 4 is a flow diagram illustrating an example process, in accordance with aspects of the present disclosure.

FIG. 4 illustrates an example dataflow for a process (480). In some examples, process 480 is performed by one or more devices in an upgrade service, e.g., upgrade service device 315 of FIG. 3. In other examples, process 480 may be performed in other suitable devices.

In the illustrated example, step 481 occurs first. At step 481, in some examples, device information associated with a device upgrade and a plurality of devices is received. In some examples, the device information includes risk parameters including values associated with a minimum health value that is associated with a minimum acceptable number of healthy devices among the plurality of devices and a confidence value that is associated with a minimum acceptable probability that the number of healthy devices among the plurality of devices is at least as great as the minimum health value. In some examples, the device information further includes, for each device of the plurality of devices, a success probability value that is associated with a probability that the device will be healthy after the device upgrade is performed on the device.

As shown, step 482 occurs next in some examples. At step 482, in some examples, a Poisson binomial distribution is iteratively used to determine, based in part on the success probability values of the plurality of devices, a set of devices among the plurality of device for which the largest possible number of devices are included in the set of devices while meeting the risk parameters, according to the Poisson binomial distribution. As shown, step 483 occurs next in some examples. At step 483, in some examples, the device upgrade is automatically performed on each device of the set of devices. The process may then proceed to a return block, where other processing is resumed.

In some examples, the steps shown in FIG. 4 may be first round of upgrades, with further rounds subsequent performed until the determined set of devices is the empty set. In some examples, the algorithm may only pause at that point, waiting for devices to reach a suitable state for upgrade, but once the determined set of devices is the empty set, no additional devices are upgraded until conditions change such that the determined set of devices is no longer than empty set. Also, the IT administrator may choose to manually stop the process at any point.

In some examples, so performing the additional rounds of device upgrades includes, for the plurality of devices excluding the devices that have already been upgraded: iteratively using a Poisson binomial distribution to determine, based in part on the success probability values of the plurality of devices, an upgraded set of devices among the plurality of devices, excluding the devices that have already been upgraded, for which the largest possible number of devices are included in the set of devices while meeting the risk parameters, according to the Poisson binomial distribution; and after determining the upgraded set of devices, automatically performing the device upgrade on each device of the upgraded set of devices.

In some examples, iteratively using the Poisson binomial distribution to determine the set of devices as shown in step 482 may include selecting a first subset of the plurality of devices; using the Poisson binomial distribution to determine a probability as to whether the number of healthy devices among the plurality of devices would be at least as great as the minimum health value after performing the device upgrade on each device in the first subset; each time it is determined that the probability would be at least as great as the minimum health value, performing a next iteration in which another device from the plurality of devices is added to the subset of devices, and using the Poisson binomial distribution to determine whether a probability as to whether the number of healthy devices among the plurality of devices would be at least as great as the minimum health value after performing the device upgrade on each device in the subset; and responsive to a determination that the probability is less than the minimum acceptable probability, selecting the set of devices as the subset of devices less the last device added to the subset of devices.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a tenant including a plurality of computing devices; and
an upgrade service device including at least one memory adapted to store run-time data for the upgrade service device, and at least one processor that is adapted to execute processor-executable code that, in response to execution, enables the upgrade service device to perform actions in conjunction with other devices as part of a distributed system, the actions including:
receiving risk parameters, including a minimum health value that is associated with a minimum acceptable number of healthy devices among a plurality of computing devices, and a confidence value that is associated with a minimum acceptable probability that the number of healthy devices among the plurality of computing devices is at least as great as the minimum health value;
receiving, for each computing device of the plurality of computing devices, a success probability value that is associated with a probability that the computing device will be healthy after an operating system upgrade is performed on the computing device; and
iteratively performing:
selecting a set of computing devices for a first upgrade round from among the plurality of computing devices by:
selecting a first subset of the plurality of computing devices; and
iteratively, beginning with the first subset, until the set of devices is selected, wherein an order of device selection includes at least one iteration, a device selected to be added to the next subset of devices includes a device from among the plurality of devices that has a success probability that is significantly lower than the device from among the plurality of devices not included in the set of devices that has the greatest success probability value:
using a Poisson binomial distribution to determine a probability as to whether the number of healthy devices among the plurality of devices would be at least as great as the minimum health value after performing the operating system upgrade on each device in the first subset;
if it is determined that the probability as to whether the number of healthy devices among the plurality of devices would be at least as great as the minimum health value after performing the operating system upgrade on each device in the first subset is less than the confidence value, selecting as the set of devices one less device than the set of devices;
if it is determined that the probability as to whether the number of healthy devices among the plurality of devices would be at least as great as the minimum health value after performing the operating system upgrade on each device in the first subset is at least as great the confidence value, selecting a next subset as the set of devices with one more computing device;
if the next subset includes each of the devices in the plurality of devices, selecting the set of devices as each of the devices in the plurality of devices; and
if the next subset includes less than each of the devices in the plurality of devices, proceeding to the next iteration based on the next subset.

2. The apparatus of claim 1, wherein the success probability values are dynamically changed over the additional round of devices upgrades.

3. The apparatus of claim 1, wherein using the Poison binomial distribution to determine the probability includes calculating a probability mass function of all of the devices in the first subset using the Poisson binomial distribution to calculate random distribution, and using the calculated probability mass function to determine a cumulative distribution function.

4. A method, comprising:
receiving device information associated with a device upgrade and a plurality of devices, wherein the device information includes risk parameters including values associated with a minimum health value that is associated with a minimum acceptable number of healthy devices among the plurality of devices and a confidence value that is associated with a minimum acceptable probability that the number of healthy devices among the plurality of devices is at least as great as the minimum health value, and wherein the device information further includes, for each device of the plurality of devices, a success probability value that is associated with a probability that the device will be healthy after the device upgrade is performed on the device;
iteratively using a Poisson binomial distribution to determine, based in part on the success probability values of the plurality of devices, a set of devices among the plurality of device for which the largest possible number of devices are included in the set of devices while meeting the risk parameters, according to the Poisson binomial distribution through:
selecting a first subset of the plurality of devices;
using the Poisson binomial distribution to determine a probability as to whether the number of healthy devices among the plurality of devices would be at least as great as the minimum health value after performing the device upgrade on each device in the first subset of the plurality of devices;
each time it is determined that the probability would be at least as great as the minimum health value, performing a next iteration in which another device from the plurality of devices is added to the first subset of the plurality of devices, and using the Poisson binomial distribution to determine whether a probability as to whether the number of healthy devices among the plurality of devices would be at least as great as the minimum health value after performing the device upgrade on each device in the first subset of the plurality of devices; and
responsive to a determination that the probability is less than the minimum acceptable probability, selecting the set of devices as the first subset of the plurality of devices less the last device added to the first subset of the plurality of devices; and
after determining the set of devices, automatically performing the device upgrade on each device of the set of devices.

5. The method of claim 4, wherein the device upgrade is an operating system upgrade.

6. The method of claim 4, wherein using the Poisson binomial distribution to determine the probability includes calculating a probability mass function of all of the devices in the first subset using the Poisson binomial distribution to calculate random distribution, and using the calculated probability mass function to determine a cumulative distribution function.

7. The method of claim 4, wherein each iteration of using the Poisson binomial distribution includes selecting said another device such that said another device is selected as the device from among the plurality of devices not included in the set of devices that has the greatest success probability value.

8. The method of claim 4, wherein at least one iteration of using the Poisson binomial distribution includes selecting said another device such that said another device is selected as the device from among the plurality of devices not included in the set of devices has a success probability that is significantly lower than the device from among the plurality of devices not included in the set of devices that has the greatest success probability value.

9. The method of claim 4, further comprising:
after automatically performing the device upgrades, performing additional rounds of devices upgrades.

10. The method of claim 9, wherein performing the additional rounds of device upgrades includes, for the plurality of devices excluding the devices that have already been upgraded:
iteratively using the Poisson binomial distribution to determine, based in part on the success probability values of the plurality of devices, an upgraded set of devices among the plurality of devices, excluding the devices that have already been upgraded, for which the largest possible number of devices are included in the set of devices while meeting the risk parameters, according to the Poisson binomial distribution; and
after determining the upgraded set of devices, automatically performing the device upgrade on each device of the upgraded set of devices.

11. The method of claim 9, wherein the risk parameters are constant.

12. The method of claim 9, wherein the success probability values are dynamically changed over the additional rounds of devices upgrades.

13. A processor-readable storage medium, having stored thereon processor-executable code that, upon execution by at least one processor, enables actions, comprising:
determining information that associated with a device upgrade for a plurality of devices, including risk parameters including values associated with a minimum health value that is associated with a minimum acceptable number of healthy devices among the plurality of devices and a confidence value that is associated with a minimum acceptable probability that the number of healthy devices among the plurality of devices is at least as great as the minimum health value, and further including, for each device of the plurality of devices, a success probability value that is associated with a probability that the device will be healthy after the device upgrade is performed on the device;
evaluating, based in part on the success probability values of the plurality of devices, a set of devices among the plurality of device for which the largest possible number of devices are included in the set of devices while meeting the risk parameters, according to a Poisson binomial distribution through:

selecting a first subset of the plurality of devices, using the Poisson binomial distribution to determine a probability as to whether the number of healthy devices among the plurality of devices would be at least as great as the minimum health value after performing the device upgrade on each device in the first subset of the plurality of devices, each time it is determined that the probability would be at least as great as the minimum health value, performing a next iteration in which another device from the plurality of devices is added to the first subset of the plurality of devices, and using the Poisson binomial distribution to determine whether a probability as to whether the number of healthy devices among the plurality of devices would be at least as great as the minimum health value after performing the device upgrade on each device in the first subset of the plurality of devices, and responsive to a determination that the probability is less than the minimum acceptable probability, selecting the set of devices as the first subset of the plurality of devices less the last device added to the first subset of the plurality of devices; and responsive to evaluating the set of devices, performing the device upgrade on each device of the set of devices.

14. The processor-readable storage medium of claim 13, wherein using the Poisson binomial distribution to determine the probability includes calculating a probability mass function of all of the devices in the first subset of the plurality of devices using the Poisson binomial distribution to calculate random distribution, and using the calculated probability mass function to determine a cumulative distribution function.

15. The processor-readable storage medium of claim 13, wherein each iteration of using the Poisson binomial distribution includes selecting said another device such that said another device is selected as the device from among the plurality of devices not included in the set of devices that has the greatest success probability value.

16. The processor-readable storage medium of claim 13, wherein at least one iteration of using the Poisson binomial distribution includes selecting said another device such that said another device is selected as the device from among the plurality of devices not included in the set of devices has a success probability that is significantly lower than the device from among the plurality of devices not included in the set of devices that has the greatest success probability value.

17. The processor-readable storage medium of claim 13, the actions further comprising:

after automatically performing the device upgrades, performing additional rounds of devices upgrades.

18. The processor-readable storage medium of claim 17, wherein performing the additional rounds of device upgrades includes, for the plurality of devices excluding the devices that have already been upgraded:

after determining the upgraded set of devices, automatically performing the device upgrade on each device of the upgraded set of devices.

19. The processor-readable storage medium of claim 13, wherein the risk parameters are constant.

20. The processor-readable storage medium of claim 13, wherein the success probability values are dynamically changed over additional rounds of devices upgrades.

* * * * *